United States Patent [19]
Smith

[11] Patent Number: 4,657,461
[45] Date of Patent: Apr. 14, 1987

[54] ANCHORING BOLT

[76] Inventor: Gareth J. Smith, 15533 Tupper St., Sepulveda, Calif. 91343

[21] Appl. No.: 665,460

[22] Filed: Oct. 26, 1984

[51] Int. Cl.⁴ ............................................. F16B 21/00
[52] U.S. Cl. ..................... 411/340; 411/107; 411/510; 24/453
[58] Field of Search ............... 411/103, 107, 340-346, 411/339, 908, 182; 24/90 R, 97, 99, 100, 100.5, 101 R, 297, 453

[56] References Cited

U.S. PATENT DOCUMENTS

| | | | |
|---|---|---|---|
| 1,061,480 | 5/1913 | Kennedy | 411/340 |
| 1,255,254 | 2/1918 | Werner | 24/101 |
| 2,061,478 | 11/1936 | Pepin | 411/340 |
| 3,080,630 | 3/1963 | Paliotta | 24/97 |
| 3,175,452 | 3/1965 | Leitner | 411/340 |
| 3,382,546 | 5/1968 | Palmay et al. | 24/90 R |
| 3,403,594 | 10/1968 | Newell | 411/344 |
| 3,900,925 | 8/1975 | La Torraca | 24/90 R |
| 4,245,545 | 1/1981 | Freeman | 411/342 |
| 4,286,497 | 9/1981 | Shamah | 411/345 |
| 4,439,079 | 3/1984 | Losada | 411/340 |
| 4,573,844 | 3/1986 | Smith | 411/340 |

FOREIGN PATENT DOCUMENTS 912009 4/1946 France ............................... 411/433

Primary Examiner—Gary L. Smith
Assistant Examiner—Neill Wilson
Attorney, Agent, or Firm—John J. Posta, Jr.

[57] ABSTRACT

The improved anchoring bolt device of the present invention is adapted to be inserted through an opening in a partition to anchor fixtures, etc., thereto. The device includes a bolt having an elongated shaft adapted to extend through the opening and bearing on its front end one or more arms pivotally connected thereto through a flexible neck and urged from a collapsed position which enables them to pass through the opening to an operative normally unfolded position behind the wall so as to anchor the device in place in the wall. In one embodiment the neck is of uniform diameter and is elongated and curved in an arc extending generally transversely of the device. The rear end of the shaft may have a loop or other means for pulling the shaft back to prevent its loss in the wall. A collet is releasably secured as by threading or ratcheting, over the shaft to hold a fixture to the outside of the wall. The shaft may be frangible to adjust its length and a rear cap may be provided. Spikes may project from the front face of the collet and rear faces of the arms to anchor them in place. The arms are in one plane and are preferably long and narrow to facilitate installation of the bolt next to a stud or header or base plate. Preferably, all components are of very inexpensive, durable resilient plastic.

8 Claims, 9 Drawing Figures

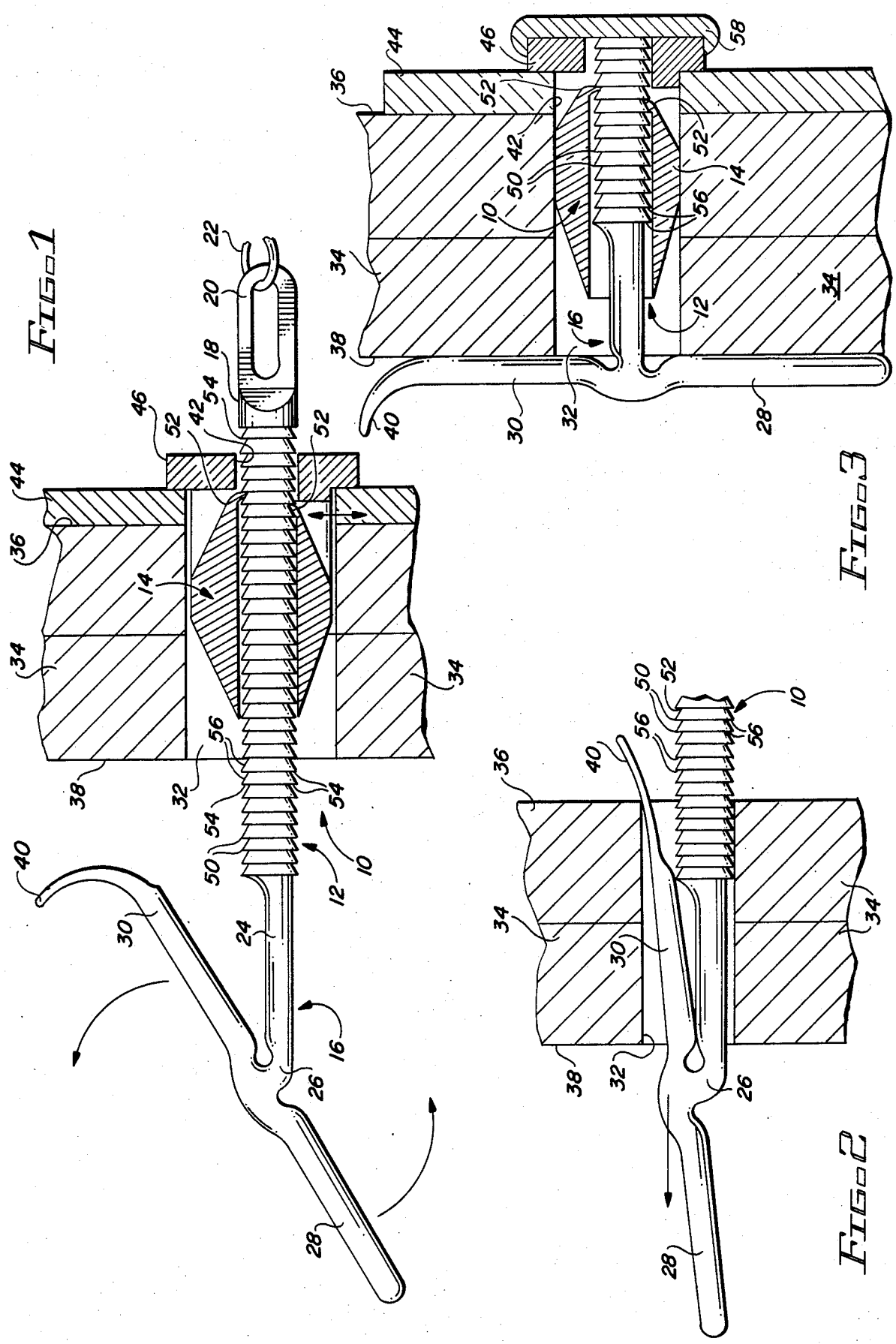

ANCHORING BOLT

BACKGROUND OF THE INVENTION

1. Field of the Invention

The present invention generally relates to securing means and, more particularly, to an improved wall anchoring device.

2. Prior Art

Various types of bolts, screws, nails and similar devices have been provided for anchoring picture frames, fixtures and other items to walls, ceilings and floors. Similar devices have been used for fixing furniture and appliance components together. Many such devices are cumbersome and/or expensive and are often difficult to install. Most such devices are incapable of anchoring fairly heavy objects to a wall or ceiling where no stud or other wood bearing member is present behind the wall. Thus, conventional anchoring systems have a tendency to loosen and fall if not firmly embedded in a stud, header, base plate or the like portion of the building frame.

One usually has to punch several holes in an existing wall before locating a stud in order to install a conventional anchor and then has to patch the excess holes. All of this takes time and is expensive. Even so-called stud locator devices are not very reliable. Moreover, when expandable bolts such as molly bolts and toggle bolts with sleeves are utilized they cannot be positioned close to a portion of the wall frame because if they are so positioned, they subsequently expand against the wall frame and are forced off-center. This causes them to bend, forcing them into misalignment with the spacing necessary for proper connection with a fixture, etc.

Applicant has filed a co-pending patent application on an "Improved Anchoring Bolt Device", U.S. Ser. No. 555,072, filed Nov. 25, 1983 now U.S. Pat. No. 4,573,844, which attempts to overcome some of the problems of the prior art. However, applicant has found that the device disclosed in that application, although being much improved over the prior art, does not completely satisfy all requirements for an improved fastening device.

Accordingly, there is a need for an improved anchoring device which does not require the presence of a portion of the wall frame in order to securely and permanently anchor fixtures, etc., to the wall. Preferably, the device should utilize a small entry hole into the wall and be equally useful in ceilings, floors, sidewalls, furniture panels, mattresses, etc. Moreover, the device should be useful in close proximity to the wooden frame supporting the wall. The device should be inexpensive, durable and efficient and require no special tools or skills. Ideally, the device should be capable of repeated reuse without premature failure. The device preferably should come in various sizes and be readily adjustable as to length, etc. When applied to a wall, the device should help to distribute the load on the wall to prevent cracking, punch out thereof, etc., and thus be useful on plaster walls, as well as dry walls.

SUMMARY OF THE INVENTION

The improved wall anchoring bolt device of the present invention satisfies all the foregoing needs. The device is substantially as set forth in the Abstract above. Thus, the device comprises a bolt and a collet. Preferably, both are made of inexpensive and durable plastic. The bolt has an elongated shaft with ridges, threads or the like on its exterior surface, while the collet preferably has a central opening to receive the shaft and either threading or flexible fingers to releasably adjustably grip the shaft so as to lock in place without danger of loosening.

The shaft preferably has a pair of arms on its front end which form a T-with the shaft when the arms are in the operative position. The arms are elongated, in generally the same plane and are biased into the operative position by resilient means interconnecting the arms and shaft. Preferably, the shaft and arms are unitary and the resilient means is a flexible neck with elastic memory, also part of the shaft. In one embodiment the neck is elongated of substantially uniform diameter and curved in an arc extending laterally or transversely of the device. The neck uniformly distributes pivoting or flexure forces (when the arms are pivoted) along its length to prevent overstressing of the neck at the juncture of the neck and arms. Thus, durability is increased.

The arms can be moved into a collapsed position generally parallel to, overlying and extending forward of the shaft to allow them to fit with the shaft through a narrow opening in a wall, after which the arms return to their normal position perpendicular to the shaft to lock it in place relative to the wall. The arms also may have rearwardly directed spikes to embed into the rear of the wall. In one embodiment, one of the arms has a curved end adapted to ride against the side of a bolt hole when the device passes therethrough, while the opposite side of the device has the previously described curved neck which is adapted to ride against the opposite side of the bolt hole when the arms are collapsed, thus positioning the shaft away from the bolt hole sides for smoother passage therethrough.

The collet fits over and releasably secures to the rear of the shaft and clamps a fixture or other item to the wall. In use, the shaft is first fed through an opening in the wall so that the arms are allowed to spring open behind the wall. A string may be passed through a rear shaft ring to keep from losing the shaft in the wall. Then a picture frame or other component to be mounted to the wall is slid forward over the shaft to abut the outside of the wall. Next, the collet is passed over the rear of the shaft to trap the item between the collet and wall, while pulling back on the shaft to tightly lock it to the collet. Any excess rear length of shaft is then snipped off and the installation is complete. The collet can then be covered with a removable cap, if desired, for improved appearance.

The shaft can be made of substantial length to fit various wall thicknesses. Moreover, in one embodiment the shaft is detachable from the arms, so that the shaft can be removed from the wall if and when desired. Various other embodiments are also contemplated.

The improved device of the present invention can be used, for example, by homeowners, apartment dwellers, contractors, decorators and in business offices and business factories and plants for a variety of purposes, including hanging pictures, wall decorations or plants, installing bath and lavatory fixtures, kitchen utensil racks, towel holders, mirrors, bulletin boards, drapery rods, cabinets, shelf brackets, fire equipment, medical dispensary boxes, thermostats, light fixtures, smoke detectors, swag lights, etc. Decorative buttons on mattresses, couches, chairs, etc., can be installed and replaced using this anchoring device. Furniture components can be connected together with this device. Moreover, wall phone bases, phone jack bases, telephone switch and call boxes, etc., can be easily wall mounted by employing this device. Telephone installation personnel who do not carry power equipment can more easily use this device than conventional anchoring means.

Various other applications and features of the present device are set forth in the following detailed description and accompanying drawings.

DRAWINGS

FIG. 1 is a schematic side elevation, partly in section, of a first preferred embodiment of the improved anchoring bolt device of the present invention, shown with the device installed in a wall and with the bolt arms thereof, during deployment to the operative position;

FIG. 2 is a schematic side elevation, partly in section, of the arms and front end of the bolt shaft of FIG. 1 as they are being passed forward through a wall opening towards the position of FIG. 1;

FIG. 3 is a schematic side elevation, partly broken away, of the device of FIG. 1 in the fully installed position, that is, after the shaft thereof has been retracted and the excess cut off, after the collet thereof has been pulled tightly against a frame to be held against the wall and after a cap has been installed over the collet;

Figure 7:
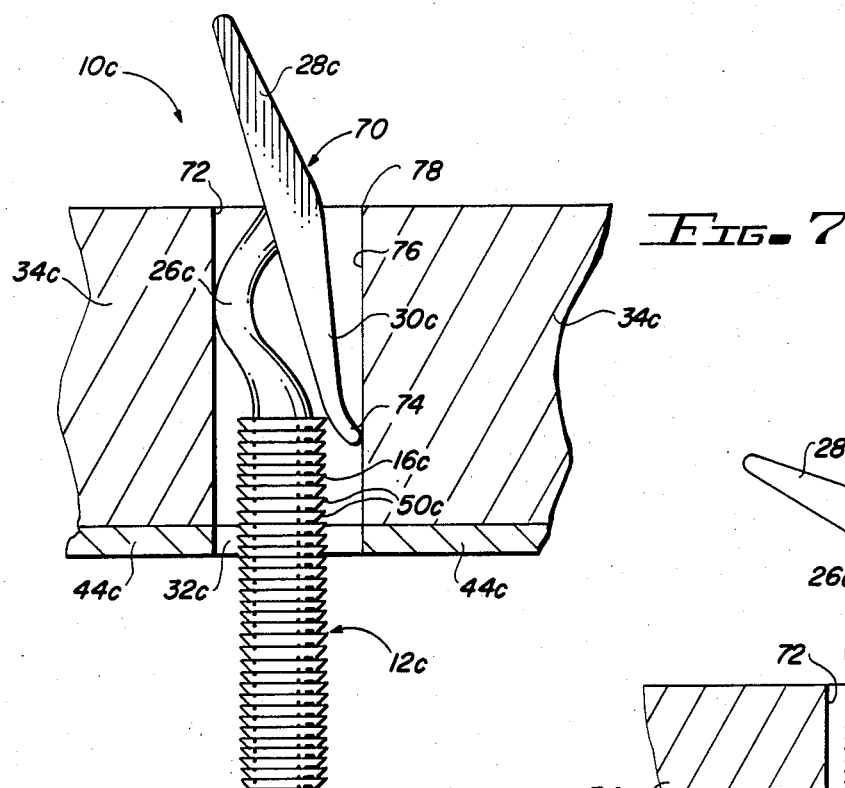
Figure 8:
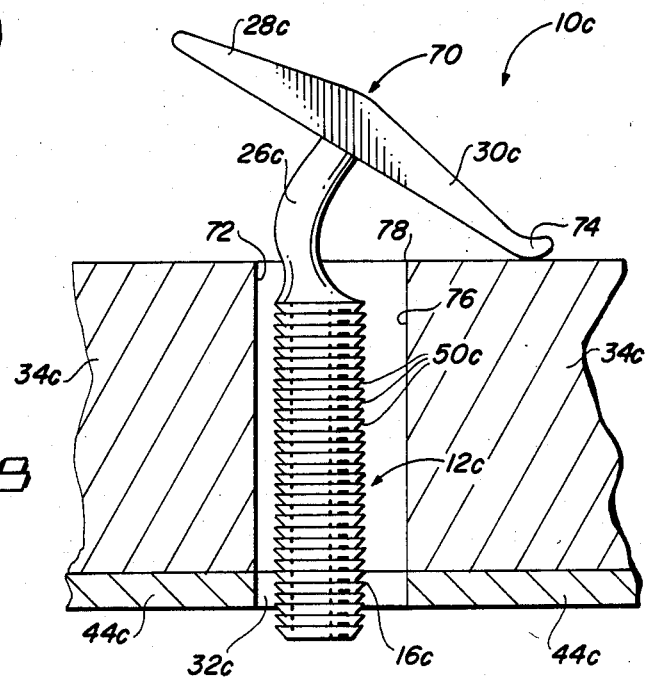
Figure 9:
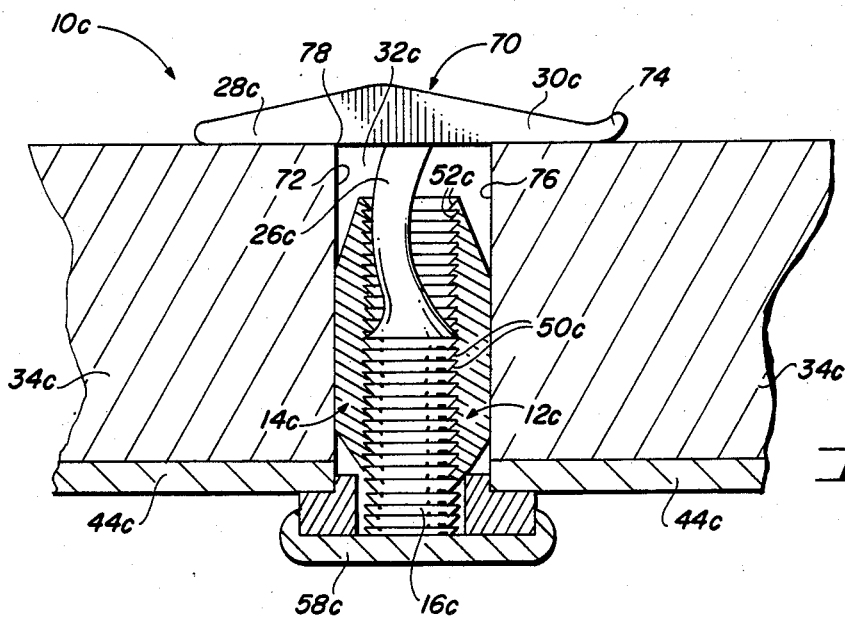

FIG. 7 is a schematic side elevation, partly in section, of a third preferred embodiment of the improved anchoring bolt device of the present invention, shown with the device passing through a bolt hole in a wall, with the bolt arms thereof in the collapsed position and with the curved neck thereof riding against one side of the bolt hole and the curved arm end thereof riding against the opposite side of the bolt hole so as to effectively space the bolt shaft therefrom for easy passage therethrough;

FIG. 8 is a schematic side elevation, partly in section, of the device of FIG. 7, shown with the arms thereof having deployment to the operative position behind a wall; and, FIG. 9 is a schematic side elevation, partly in section, of the device of FIG. 7, shown in the fully installed positioned, that is, after the shaft thereof has been retracted and the excess cut off, after the collet thereof has been pulled tightly against a frame to be held against the wall in which the device is inserted and after a cap has been installed over the collet.

DETAILED DESCRIPTION

FIGS. 1-4.

Now referring more particularly to FIGS. 1-4 of the accompanying drawings, a first preferred embodiment of the improved anchoring bolt device of the present invention is schematically depicted therein. Thus, device 10 is shown in FIG. 1 which comprises a bolt 12 and collet 14, both of which are preferably fabricated of durable plastic, although they could be largely of metal, such as aluminum, steel, etc., or largely of ceramic, wood, etc.

Bolt 12 includes an elongated cylindrical or generally flat shaft 16 having a rear end 18 preferably, including a shaft retracting component, in this instance a loop or ring 20 through which a string 22 or the like can be passed for retrieval of shaft 16, as subsequently described. The front portion 24 of shaft 16 includes a flexible neck section 26 to which a pair of arms 28 and 30 are pivotally connected. In the embodiment of FIG. 1, arms 28 and 30 and section 26 are integral with shaft 16. Arms 28 and 30 are generally in the same plane, are elongated and narrow and are retractable between the fully operative position shown in FIG. 3, wherein they are about perpendicular to shaft 16, and the collapsed position shown in FIG. 2 wherein they are generally parallel to overlie and extend forward of shaft 16 and are easily passable with shaft 16 through an opening 32 in a wall 34. Preferably, arms 28 and 30, section 26 and shaft 16 are of resilient plastic having a memory, so that arms 28 and 30 normally are in the position shown in FIG. 1 or FIG. 3 and when forced into the position shown in FIG. 2, they spring back to the position of FIG. 1 or 3 as soon as they pass through opening 32. When they do so, they prevent shaft 16 from being removed from wall 34. Thus, as shaft 16 is pulled back towards the front 36 of wall 34, arms 28 and 30 assume the position of FIG. 3, abutting the rear 38 of wall 34 and stopping such withdrawal. The plastic of bolt 12 may be, for example, polyethylene, fluoroethylene, nylon or another suitable plastic.

It will be understood that wall 34 can be a building ceiling, sidewall, partition or floor, or the like, or the wall of a piece of furniture, mattress, machine, appliance, etc., or other item. In fact, device 10 can be used in conjunction with a wide variety of constructions of various types.

It will be noted that free end 40 of arm 30 may be curved forwardly and is very flexible. Thus, it straightens under pressure to easily pass through opening 32, as shown in FIG. 2, but acts as a hole guide in so doing, allowing the user of device 10 to have a precise feel for the position of arms 28 and 30 as bolt 12 is advanced through hole 32. This is an important feature in blind installation situations.

Device 10 is used by first drilling or otherwise providing hole 32, then advancing arms 28 and 32 and shaft 16 therethrough (FIG. 2) until arms 28 and 30 clear the rear 38 of wall 34 and spring to their normal position (FIG. 1 or 3), trapping shaft 16 in wall 34.

The rear end 18 of shaft 16 is then fed back through an opening 42 in item 44 to be connected to the front 36 of wall 34, using ring 20 and string 22, if necessary, whereupon, collet 14, of which is generally cylindrical and is dimensioned to fit in opening 32, is slipped over rear end 18 and pushed forward tightly against item 44 while retracting shaft 16, so that collet 14 locks item 44 in place.

Collet 14 includes an extended circular rear wall 46 and a central passageway 48 extending longitudinally therethrough and which receives shaft 16. Collet 14 also includes peripheral indentations 49 which permit a tool to grip collet 14 and rotate it along shaft 16, for applications hereinafter set forth.

Shaft 16 bears frustro-conical rims 50 spaced along the length thereof and sloped as shown in FIGS. 1-3, while collet 14 bears flexible, rearwardly and inwardly directed opposed fingers 52 which extend into passageway 48, to releasably grip the undersides 54 of rims 46 and fit into the spaces 56 between rims 50, allowing forward movement of the collet 14 over rims 50, but preventing rearward movement of collet 14 relative to shaft 16, and thus locking item 44 between wall 46 of collet 14 and front 36 of wall 34.

Thus, by simultaneously pulling back on shaft 16 (as by string 22) and forcing fingers 52 of collet 14 forward over rims 50, arms 28 and 30 are eventually forced against rear 38 of wall 34 and device 10 (and item 44) is locked tightly in place (FIG. 3). The portion of shaft 16 which then extends rearwardly of wall 46 is clipped, cut, sawed or broken off and cap 58 may be releasably secured over collet 14 to conceal it. Cap 58 can also be of plastic, wood, etc. In the event collet 14 is not plastic, fingers 52 must nevertheless be of flexible plastic, rubber or the like. So also must section 26 of shaft 16 if shaft 26 is itself not resilient plastic.

Device 10 is simple, inexpensive, durable, efficient and adapted for use with various wall thicknesses. Moreover, it distributes the load of item 44 evenly over wall 34 and can be used very close to a wall stud, header, base plate, etc., or to ceiling or floor joist, etc., without bending or otherwise distorting, since arms 28 and 30 are long and narrow and can be rotated via shaft 16 to any desired orientation behind wall 34.

FIG. 5

Figure 4:
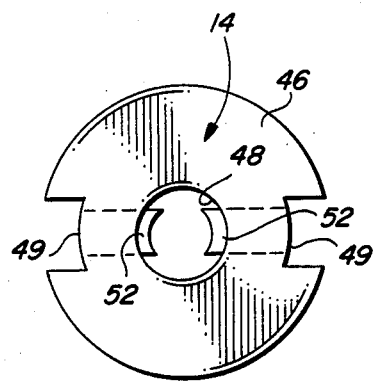
FIG. 4 is a schematic rear end view of the collet of FIG. 1.
Figure 5:
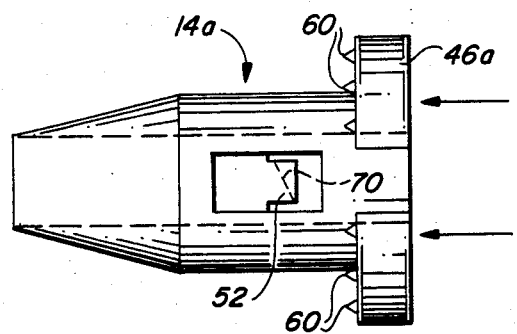
FIG. 5 is a schematic side elevation of a modified version of the collet.

A modified version of the collet used in the device of the present invention is schematically depicted in FIG. 5. Thus, collet 14a is shown. Components thereof similar to collet 14 bear the same numerals, but are succeeded by the letter "a". Collet 14a differs from collet 14 only in that spaced spikes 60 are connected to and directly forwardly from wall 46a. Spikes 60 help to anchor collet 14a in, for example, item 44, if and when collet 14a is used in place of collet 14 in the manner shown in FIG. 3.

FIG. 6

Figure 6:
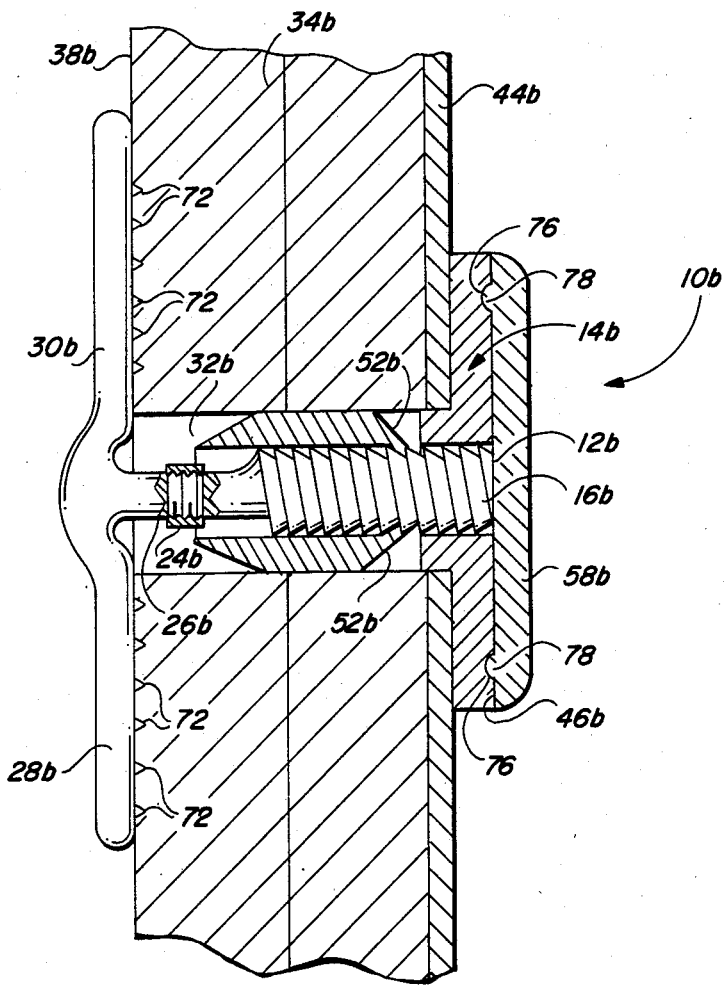
FIG. 6 is a schematic side elevation, partly in section, of a second preferred embodiment of the improved anchoring bolt device of the present invention, shown with the bolt thereof fully installed and releasably holding a plate against a wall.

A second preferred embodiment of the improved wall anchoring device of the present invention is schematically depicted in FIG. 6. Thus, device 10b is shown. Components thereof similar to those of device 10 bear the same numerals, but are succeeded by the letter "b". Thus, device 10b includes both bolt 12b and collet 14b.

Bolt 12b includes elongated shaft 16b which has a spiral rim 50b thereon in place of rims 50. Shaft 16b is preferably fabricated of plastic or aluminum, magnesium or other light weight metal.

Bolt 12b further includes arms 28b and 30b which differ from arms 28 and 30 only in that flexible section 40 is missing and in that a plurality of spaced spikes 72 project from surfaces 74 thereof to anchor arms 28b and 30b firmly to rear 38b of wall 34b. Arms 28b and 30b are connected to shaft 16b by flexible connector section 26b which is preferably integral with arms 28b and 30b. Arms 28b and 30b, as well as 26b, are preferably plastic, although arms 28b and 30b could be of metal, etc. Section 26b has elastic memory in the same manner as section 26 to permit arms 28b and 30b to rotate to a collapsed position against shaft 16b and thus fit through opening 32b in wall 34b, but spring to the anchoring position of FIG. 6 once they are behind wall 34b. Section 26b is threaded into the front end 24b of shaft 16b, so that shaft 16b can be readily disconnected therefrom and fully withdrawn from opening 32b, if desired.

Collet 14 is preferably of plastic or light weight metal and differs from collet 14 only in that the top of fingers 52b are cut at an angle as shown in dotted lines 70 in FIG. 5 to fit under spiral rim 50b. Collet 14b can be slid down over shaft 16b in the manner described with respect to FIG. 3, or, alternatively, can be rotated to be screwed down on shaft 16b. Indentations 49 on collet 14b are adapted to receive an appropriate tool to rotate collet 14b, which can be screwed off and on shaft 16, as desired. Rear wall 46b of collet 14b can include a pair of recesses 76 which receive prongs 78 of cap 58b to releasably hold cap 58b over collet wall 46b, for decorative purposes.

Device 10b is installed in the same manner as device 10 and operates similarly thereto, with similar advantages. Various other advantages of the improved anchoring device of the present invention are as set forth in the foregoing.

FIGS. 7, 8 and 9

A third preferred embodiment of the improved wall anchoring device of the present invention is schematically depicted in FIGS. 7, 8 and 9. Thus, device 10c is shown. Components thereof similar to those of device 10 or 10b bear the same numerals, but are succeeded by the letter "c". Thus, device 10c includes bolt 12c and collet 14c.

Bolt 12c includes elongated shaft 16c having transversely extending frusto-conical rims 50c spaced along the length thereof. Shaft 16c preferably is of plastic or hard rubber. Bolt 12c also includes elongated arms 28c and 30c forming a straight rod 70 and interconnected at the midpoint thereof to the front end of shaft 16c by a flexible neck 26c, which is preferably integral with arms 28c and 30c and shaft 16c.

Neck 26c has elastic memory and is elongated, and preferably of substantially uniform diameter throughout most or all of its length. It is also curved in an arc extending generally transversely of device 10c so as to permit arms 28c and 30c to be easily placed in the collapsed position to facilitate their passage through opening 32c on wall 34c, as shown in FIG. 7. It will be noted that in such a position, neck 26c extends laterally in an arc from one side of shaft 16c so as to contact one side 72 of bolt hole 32c (if hole 32c is narrow enough) and ride easily thereover, spacing shaft 12c from side 72. It will also be noted that arm 30c has a smooth curved tip 74 which is adapted to ride easily against the opposite side 76 of bolt hole 32c, spacing shaft 12 therefrom from the smooth possible passage of device 10c through hole 32c. Thus, tip 74 and neck 26c act as effective guides to direct bolt 12c through hole 32c.

It will be noted from FIGS. 7, 8 and 9 that neck 26c is long and allows rod 70 to readily rotate between the collapsed positon of FIG. 7 and the fully operative positon of FIG. 9 without any strain on the point of connection of neck 26c and rod 70. The length, flexibility and substantially uniform diameter of neck 26c assure that bending stresses in neck 26c are minimized and are distributed uniformly along the length thereof. Since neck 26c contains no thin or small diameter portions, there is no focal point for stress in neck 26c. This construction increases the effective life of neck 26c, preventing its overstressing and failure if repeatedly flexed between the positions shown in FIGS. 7 and 9. It should be noted that when viewing device 10c in its at rest position of FIG. 8, no stress is developed at the juncture of neck 26c and rod 70. Therefore, minimum relative stress is developed at such juncture when rod 70 is rotated to the positions shown in FIGS. 7 and 9. The reinforcement of rod 70 at such juncture also increases the strength of device 10c at the juncture.

The elastic memory of neck 26c causes rod 70 to automatically spring to the position of FIG. 8, once the rear end 78 of hole 32c is cleared as bolt 12c is passed through hole 32c during its installation. In that position (FIG. 8) arms 28c and 30c bridge hole 32c and brace against the rear end of wall 34c on opposite sides thereof. As was previously described for devices 10 and 10b, in order to complete the installation of devije 10c, shaft 16c is then pulled forward, and collet 14c is ratcheted forward thereover and into hole 32c, locking shaft 16c and rod 70 in place, with arms 28c and 30c flat against the rear wall 34c (FIG. 9). As shown in FIG. 9, collet 14c can be the same as collet 14, including flexible fingers 52c gripping frusto-conical rims 50c. It will be understood that, if desired, rims 50c can be spirally threaded as in the case of rims 50b and shaft 16b so that collet 50c can be screwed on and off of shaft 16c, as desired, rather than ratcheted forward.

The excess amount of shaft 16c protruding from the front of wall 34c after collet 14c is fully installed can then be trimmed off, and button or cap 58c can then be pressed fitted thereover to complete the installation of device 10c. It will be understood that if device 10c is to be used to hold an item in place against wall 34c, such an item may be, for example, frame 44c or the like and such item fits between collet 14c and wall 34c (FIGS. 7, 8 and 9).

As also can be seen from FIGS. 7, 9 and 9 and from the description set forth above, device 10c is generally similar to and has generally the same properties, components and advantages as devices 10 and 10b. Moreover, it is installed in a similar manner. It further features elongated neck 26c having improved fatigue resistance and durability.

Other and equivalent devices can be readily constructed utilizing the principles of applicant's invention, without departing from the scope and intent thereof. For example, the mechanical interlocking features of the collet and the shaft could be intercharged, i.e., the shaft could carry extendible fingers and a hollow collet could have internal rims (spiral or parallel) which coact with the fingers to lock together (releasably or otherwise) the collet and shaft. Another variation would be to design the shaft as a hollow cylinder adapted to receive the collet within the cylinder, with the interior of the shaft carrying the fingers which would coact with with rims on the collet, or alternatively, the shaft carrying the rims and the collet carrying the fingers.

Various modifications, changes, alterations and additions can be made in the improved anchoring device of the present invention, its components and their parameters. All such changes, modifications, alterations and additions as are within the scope of the appended claims form part of the present invention.

What is claimed is:

1. An improved anchor bolt device, said device comprising, in combination:
   (a) a bolt member adapted to be inserted through an opening in a wall, said bolt including:
      (1) an elongated shaft,
      (2) a pair of arms pivotally connected to the front end of said bolt and adapted to move between a collapsed position, substantially parallel to said shaft when being passed through an opening in a member, and an operative extended position substantially at a right angle to said shaft after it has passed completely through said opening, and
      (3) resilient deformable means interconnecting said shaft and said arms which has an elongated, curved neck when in an at-rest position, said neck further having an elastic memory; and
   (b) a closure member adapted to be secured to said bolt to provide a closure assembly.

2. The improved anchor bolt device of claim 1 wherein said arms form a continuous rod and wherein said neck joins said rod at about the midpoint thereof and wherein said rod increases in thickness towards its point of interconnection with said neck.

3. The improved anchor bolt device of claim 1 wherein said neck joins said arms at about the longitudinal centerline of said device.

4. The improved anchor bolt device of claim 1 wherein the thickness of said neck is substantially uniform along the length thereof, whereby bending stress is equally distributed along said length for improved durability of said device.

5. The improved anchor bolt device of claim 1 wherein one of said arms includes a curved tip adapted to ride against one side of a bolt hole and space said shaft therefrom during passage of said arms, neck and shaft therethrough, and wherein said neck curves laterally outwardly from the opposite side of said device when said arms are collapsed, whereby during said passage through said bolt hole said neck rides against the opposite side of said bolt hole, also spacing said shaft therefrom, for improved ease of passage therethrough.

6. The improved anchor bolt device of claim 5 wherein said neck is smooth and its curvature is a substantially uniform arc extending transversely and forwardly from the front end of said shaft and curving back to about the longitudinal centerline of said device at the point of connection of said neck with said arms.

7. In an improved anchor bolt device having
   (a) a bolt adapted to be inserted through an opening in a wall, said bolt including
      i. an elongated shaft bearing shaft surface gripping means, and,
      ii. a pair of inter-connected, substantially rigid, opposed arms integral with and pivotally connected to the front end of said bolt and adapted to move between a collapsed, inoperative position wherein one arm extends forwardly of the end of shaft and the other arm extends rearwardly of said end of said shaft so as to pass with said shaft through an opening in a wall, and an operative extended position substantially at a right angle to said shaft, said pair of opposed arms when at rest, extending at an angle other than 90° with respect to said shaft,
      iii. a portion of the front end of said shaft constituting resilient, deformable means connecting said shaft to said arms and adapted to urge said arm towards said operative position; and,
   (b) a collet adapted to releasably connect to the rear portion of said shaft having,
      i. an opening extending therethrough, which opening receives the rear end of said shaft, and,
      ii. securing means surrounding said opening and adapted to releasably engage said shaft gripping means to releasably secure said shaft against a wall, the improvement comprising:

having said resilient, deformable means, in the shape of an elongated, curved neck when in an at-rest position, said neck further having an elastic memory.

8. The improved anchor bolt device of claim 7 wherein the thickness of said arm at the point of interconnection with said neck is substantially greater than the thickness thereof at the opposite ends thereof.

* * * * *